INVENTOR.
JOHN W. TILEY

United States Patent Office 3,266,565
Patented August 16, 1966

3,266,565
HEAT TRANSFER MEANS
John W. Tiley, Hatboro, Pa., assignor to Philco Corporation, Philadelphia, Pa., a corporation of Delaware
Filed June 12, 1962, Ser. No. 202,000
9 Claims. (Cl. 165—135)

This invention relates to heat transfer means, and more particularly to panel structure including means for controlling the passage of thermal radiation therethrough.

Exposure of walls of an enclosure alternately to thermal radiation from the sun by day and to the relatively cold sky by night is conducive to wide fluctuations in the internal temperature of the enclosure, and control of such internal temperature under such conditions is frequently important to ensure life support, proper functioning of processes, proper storage temperatures, and personal comfort. Efforts toward controlling the admission of incident radiation have involved coatings of a permanently reflective nature. However, in the field of thermal radiation it is well known that a good reflective surface is a poor radiator, whereas a good radiative surface is both a good absorber and a poor reflector. For this reason panel structure that is so constructed and arranged as to perform well as a reflector of thermal radiation by day is practically useless as a radiator should need arise for radiating residual heat by night, as may be the case in a hot climate. Also, panel structure that is constructed and arranged to perform well as a radiator is practically useless as a reflector.

It is therefore an objective of the present invention to provide panel structure having variable and controllable reflectivity-absorptivity characteristics.

It is a further objective of the invention to provide panel structure that includes means responsive to the presence or absence of thermal radiation incident thereon automatically to modify the reflectivity-absorptivity characteristics of the structure.

It is a further objective of the invention to provide apparatus for controlling the flow of heat by radiation into and out of an enclosure.

To the foregoing general ends, and in accordance with a preferred embodiment of the invention, my improved panel means for controlling the flow of energy by radiation comprises: a chamber defined in part by a transparent wall and a black-surface wall spaced therefrom, the black-surface wall including a plurality of fluid flow restrictive orifices; a plurality of relatively small chambers disposed to the side of said black-surface wall opposite said chamber, and communicating with said orifices; a porous self supporting mass of energy scattering material disposed within said chamber; and vaporizable fluid filling the interstices of said porous mass in said chamber, the fluid, the scattering material, and the transparent wall each having substantially the same index of refraction at a spread of wave lengths of radiant energy impinging upon and radiated by the enclosure.

The scattering material preferably, but not necessarily, is in the form of a porous mass of powder held together by suitable binder means, and when the powder is mixed with a similarly transparent liquid of the same refractive index, the whole becomes spectrally homogeneous, and the opacity which would normally result from energy scattering due to the irregular specular reflection and refraction of the particles of powder disappears. As radiant heat from the sun, for example, passes sequentially through the outer wall, the fluid, and the powder, the black surface is heated due to impingement of the sun's thermal radiation thereon. As the black surface is heated, the liquid is heated by conduction until it is caused to vaporize and flow through the orifices into the relatively cold smaller chamber and condense therein. The powder then becomes relatively dry, covers the black surface and scatters thermal radiation, substantially preventing further heat flow into the enclosure.

As the sun's rays cease to impinge on the structure, the enclosure becomes relatively warmer than its surroundings. As a result, heat within the enclosure will cause the fluid within the small chambers to vaporize and flow back into the large relatively cold chamber which is then at a lower pressure than the small chambers. The dry porous mass thereby is again immersed in the fluid, and heat from within the enclosure thereafter is radiated from the black surface sequentially through the transparent fluid and powder mixture, the transparent outer wall, and thence into the surrounding colder region.

By the foregoing arrangement of elements there is provided simple and effective wall structure having variable radiant-heat reflectivity characteristics controlled substantially automatically in response to the presence or absence of a radiant energy source.

The foregoing as well as other objectives and features of the invention will become more apparent from a consideration of the following description taken in light of the accompanying drawing, in which.

Figure 1:
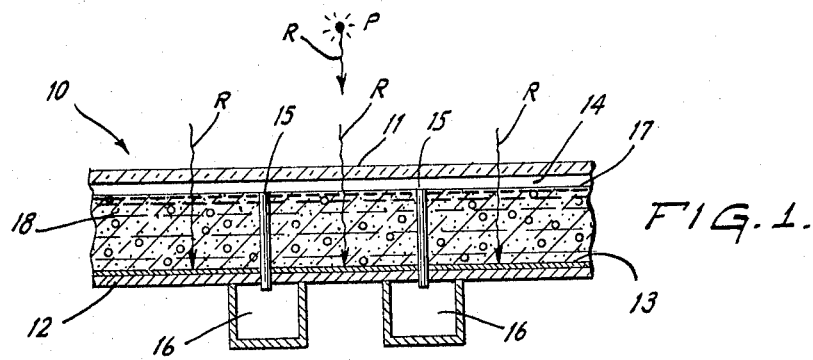
FIGURE 1 is an enlarged sectional view of a fragmentary portion of wall structure embodying the invention, and shown at the time of initial exposure to a radiant heat source.

With more particular reference to the drawing, and first to FIGURE 1, wall structure 10 made in accordance with the invention comprises an outwardly facing wall 11 of material substantially transparent to thermal radiation, such for example as quartz or certain types of glass, spaced from and confronting an inner wall 12 having a black surface 13. It should be understood that this wall would normally be extended to provide horizontal boundaries of an enclosure, not illustrated. Also, the horizontal boundaries of an enclosure could comprise several such individual wall structures.

Walls 11 and 12 also comprise boundaries of an hermetically sealed fluid chamber 14, and inner wall 12 has a plurality or orifice means such as tubes 15 connected in fluid flow communication with a plurality of chambers 16 disposed to the inside of inner wall 12—that is, within the enclosure—and extending to within a relatively short distance from wall 11.

A suitable vaporizable, radiant energy transmissive fluid 17, such for example as carbon bisulphide, substantially fills chamber 14, and a layer of quartz powder 18, having substantially the same index of refraction as the fluid 17 is dispersed in the latter in a porous mass held together by suitable binder means, for example by sintering. The fluid and the quartz powder 18 form a transparent, spectrally homogeneous mass as respects thermal radiation, although for the sake of illustration the powder is sectioned in both its wet and dry states to show its positional relationship. In the embodiment illustrated it is assumed that the structure is positioned horizontally, so the fluid is prevented from draining, by gravity, into the small chambers 16 due to location of the upper open ends of the tubes 15 at or just above the level of the fluid. Obviously the outlet openings could be constructed and arranged to accommodate other physical positioning of the wall structure.

Still with reference to FIGURE 1, it will be assumed that the wall structure 10 has moved into a position to be impinged by radiant energy from an external source represented as a point P, such for example as the sun. The radiant energy, as indicated by arrows R, passes through wall 11 and fluid-quartz powder mixture 17, 18 to impinge upon black surface 13. Black surface 13 becomes relatively warm, and heat is given up to fluid 17 in an amount sufficient to vaporize the same, as indicated by the bubbles.

Figure 2:
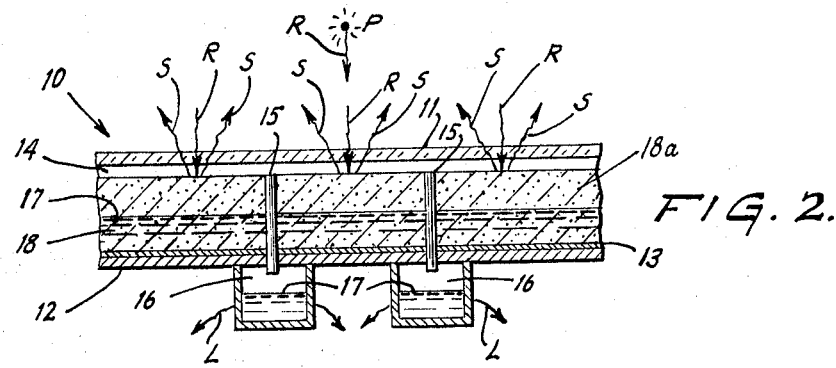
FIGURE 2 is a view similar to FIGURE 1 and subsequent to brief initial exposure to the radiant heat source.

With reference to FIGURE 2, it will be seen that the vapor flows through orifices or tubes 15 into relatively colder chambers 16, where it gives up its latent heat of vaporization (see arrows L) and again condenses. At atmospheric pressures normally encountered at or near sea level, under which conditions the present embodiment is considered to be operating, the carbon bisulphide will boil when its temperature reaches 115° F. thereby tending to limit further temperature rise of the inner wall 12. Also a temperature rise in the interior of the enclosed structure substantially is prevented, as will be more fully appreciated from what follows. Howeve, it will be understood that operating temperatures may be varied according to the operating environment of the wall structure, by preselecting pressures within the chambers at the time the system is hermetically sealed.

Evaporation of fluid 17 from chamber 14 leaves at least an outer layer 18a of the porous mass 18 dry. Since the dry porous mass 18a is interposed between the source P and the black surface 13, and by virtue of the radiant energy scattering properties of the dry layer, absorptivity of the wall structure is changed and relatively lesser amounts of radiant energy are absorbed, and greater amounts are scattered, as indicated by arrows S. It will therefore be appreciated that there is substantially little or no further heat absorption due to thermal radiation above the vaporization temperature of the fluid.

Figure 3:
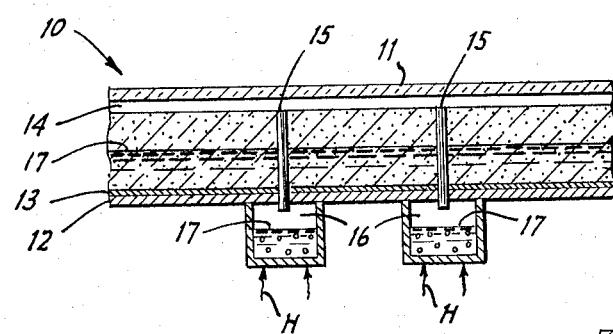
FIGURES 3 and 4 are views similar to the foregoing, but in which the radiant heat source has been absent for pre-determined periods.

As seen in FIGURE 3, the body is no longer in the sun's rays, under which condition heat within the body bounded in part by wall structure 10, and indicated by arrows H, evaporates fluid 17 within chambers 16, and the vapors flow through orifices 15 into relatively cold chamber 14 to recondense therein.

Figure 4:
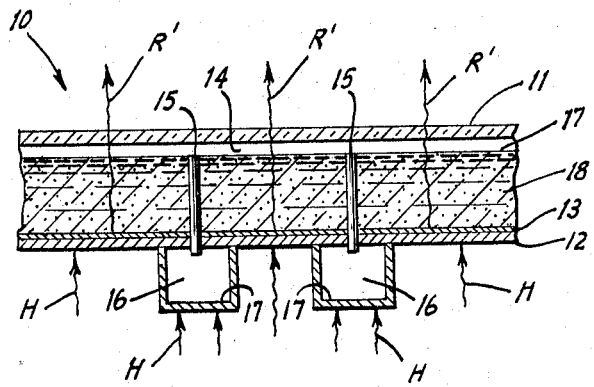

As seen in FIGURE 4, evaporation continues until all fluid has been removed from the chambers 16 and recondensed in chamber 14. The fluid 17 in chamber 14 will again disperse throughout pores of mass 18, and heat (arrows H) will subsequently be radiated, as indicated by arrows R', from black or heat absorptive surface 13, through the fluid and the porous quartz mass, thence through transparent wall 11, to the relatively colder environment.

In view of the foregoing it will be appreciated that the energy transmissive properties of elements of the wall construction are such that radiant heat can be made to pass in either direction through the energy transmissive elements.

While orifices 15 have been illustrated, by way of example, in the form of continuously open upright tubes, it will be understood that other orifice means may be used. For example, pressure actuated check valve means may be used in pairs between each smaller chamber 16 and larger chamber 14. In such event, one valve of each pair would permit vapor flow from outer chamber 14 to an inner chamber 16 in response to a predetermined pressure-temperature rise in the chamber 16, with the other valve remaining closed. Conversely, the mentioned other valve would open to permit flow of vapor from an inner chamber 16 to outer chamber 14, the mentioned one valve remaining closed, upon a pressure-temperature rise in inner chamber 16. Valving in this manner would permit somewhat inclined, rather than the illustrated horizontal, positioning of the wall structure.

Figure 5:
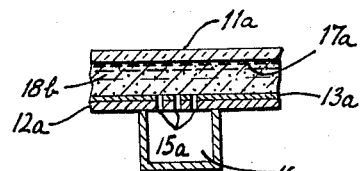
FIGURE 5 is a sectional view of a modified embodiment of the invention.

Considering still another aspect of the invention, also by way of example, the scattering material may be formed as a porous layer 18b (FIGURE 5) in which the pores are interconnected, and the layer is sandwiched between the outer transparent sheet 11a and the heat absorptive wall 12a. The orifices are formed as capillary-like passages 15a interconnecting interstices of porous layer 18a and the smaller inner chambers 16a. By virtue of vapor-pressure differentials normally existing between either side of the orifices when the system is conditioned either for reflection in the presence of a radiative external source or for radiation in the absence of such a source, coupled with the capillary nature of the orifices, gravity flow of the liquid between porous layer 18a and smaller chambers 16a may be substantially precluded. Operation of this modified form is the same as illustrated in FIGURES 1 to 4, but such form is less critical as to variations in gravitational forces and as to its horizontal or vertical positional relationship as respects the earth. As in the embodiments shown in FIGURES 1 to 4, as soon as fluid evaporates from the pores of the relatively rigid compacted layer 18b and flows to the chambers 16a to condense therein, scattering of the impinging rays will begin. Complete evaporation of the fluid need not take place for scattering to begin, and it may even be desirable that less than complete vaporization occur so that some radiant thermal energy impinges on the black-surface to maintain a sufficient amount of heating to ensure positive vapor pressure in the pores of layer 18b.

It will be appreciated that the invention has wide applicability, particularly to structures found in desert areas where temperatures in the day are likely to reach values in excess of 100° F., whereas at night temperatures may drop to values as low as 50° F. to 60° F. or even lower. In the day it is desirable to minimize the effects of solar radiation by reflecting same, and by night to radiate stored heat arising, for example, from thermal radiation that has not been reflected, and possibly from use of electronic equipment and machinery within an enclosure or housing impinged by solar radiation.

It will be appreciated still further that the invention can have utility in certain types of earth satellite apparatus in which it is desired to control radiation and absorption as the device moves about the earth, into and out of its shadow.

While but preferred embodiments of the invention have been illustrated and described, it will be understood that such modifications may be made as fall within the scope of the appended claims.

I claim:

1. Panel structure for modifying the transmission of thermal radiation, comprising: a wall substantially transparent to thermal radiation; wall means spaced from and substantially coextensive with said wall, said wall and said wall means cooperating to define a first chamber; a layer of thermal radiation scattering material disposed between said wall and said wall means and having interconnecting fluid pervious passages therein; radiant heat transmissive fluid disposed within said first chamber, in the passages of said pervious layer, and capable of flow into and out of the latter, said fluid, said layer, and said transparent wall having substantially equal indices of refraction; means defining a fluid storage chamber in fluid flow communication with said first chamber and with said fluid passages; and means responsive to the presence or absence of thermal radiation upon said panel structure to effect, respectively, flow of said fluid out of and into passages of said pervious layer in said first chamber and to and from said storage chamber, said scattering material in combination with said fluid being effective to transmit thermal radiation through said panel structure, and said scattering material, in the absence of substantial quantities of said fluid in said chamber, being effective to scatter thermal radiation and preventing transmission of such radiation through said panel structure.

2. Panel structure according to claim 1 further characterized by the fact that said fluid is vaporizable, said wall means includes a thermal radiation absorptive surface and has fluid flow orifices extending therethrough, and said storage chamber is disposed in fluid flow communication with said orifices to receive said fluid as it is caused to flow from said first chamber and the passages in said pervious layer, thermal radiation impinging upon said absorptive surface being effective to raise the temperature of the surface to a value effective to heat and vaporize said fluid, and cause it to flow from said first chamber into said storage chamber.

3. Panel structure according to claim 1 and further characterized in that said fluid pervious layer comprises a porous mass of a suitable powder held together by binder means.

4. Panel structure for modifying the flow of radiant energy comprising: first chamber means defined at least in part by a transparent wall and a black surface wall spaced therefrom; second chamber means; a porous layer of radiant energy scattering material disposed within said first chamber means; fluid flow restrictive orifices interconnecting said first and second chamber means and in fluid flow communication with the interstices of said porous layer; and vaporizable fluid filling the interstices of said porous layer of scattering material, the latter, the fluid, and the transparent wall having substantially equal indices of refraction over a range of wavelengths of radiant energy impinging upon and radiated by the black surface wall, said fluid being heated to its vaporization temperature by such energy and caused to flow, by changes in fluid pressure due to vaporization, through the interstices of said porous layer and through said orifices to and from said first and said second chamber means, said scattering material in the absence of any substantial quantity of said fluid being effective to scatter radiant energy impinging thereon to prevent such energy from impinging on said black surface wall, and in the presence of said fluid being effective to transmit radiant energy impinging thereon as it is radiated by or is directed toward said black surface wall.

5. Panel structure for modifying the transmission of thermal radiation, comprising: a radiant heat transmitting wall; radiant heat absorbing wall means spaced from and substantially coextensive with said heat transmitting wall for absorbing heat transmitted through the latter, said wall and said heat absorbing wall means cooperating to define a first chamber; vaporizable radiant heat transmissive fluid disposed within said first chamber and capable of being vaporized by heat absorbed by said wall means; a fluid pervious layer of thermal radiation scattering material disposed within said first chamber and having its interstices normally filled with said fluid, the fluid having substantially the same index of refraction as the scattering material, said material being operable to scatter thermal radiation impinging upon said panel structure as the fluid is vaporized from within the interstices of the scattering material and driven out of the same; and second chamber means in fluid flow communication with said interstices accommodating flow of fluid to and from the latter and said first chamber.

6. Means for modifying the admission of thermal radiation into an enclosed space, comprising: first chamber means defined by a wall transparent to thermal radiation and confronting radiant heat absorptive wall means spaced from said wall, said wall means including a plurality of fluid flow orifices; second chamber means disposed to the side of said heat absorptive wall means opposite said first chamber means and communicating with said orifices; a porous mass of thermal radiation scattering material disposed in said first chamber means, between said transparent wall and said heat absorptive wall means, said orifices being disposed in fluid flow communication with the interstices of said porous mass; and a vaporizable fluid filling the interstices of said porous mass, said fluid and said mass each having substantially the same index of refraction as said transparent wall and together being effective to transmit thermal radiation for impingement on said heat absorptive wall means, said fluid being vaporizable upon thermal irradiation of said heat absorptive wall and thereby caused to flow from interstices of said porous mass through orifices into said second chamber means, thereby leaving said porous scattering material in a relatively dry state in which it is effective to scatter thermal radiation impinging thereon and prevent such radiation from impinging upon said heat absorptive wall, said fluid in the absence of such thermal irradiation being capable of return flow from said second chamber means, through said orifices, and into interstices of said porous mass.

7. Means for controlling the admission of solar radiation into an enclosed space, comprising: a first chamber including a transparent wall and a confronting radiation absorptive wall, the latter including a plurality of fluid flow restrictive orifices in fluid flow communication with said first chamber; a plurality of relatively small chambers disposed to the side of said absorptive wall opposite said first chamber and communicating with said orifices; a vaporizable fluid normally disposed in said first chamber; and a light scattering material dispersed throughout said fluid, the interstices of said material being disposed in fluid flow communication with said chamber and orifices, said fluid and said material each having substantially the same index of refraction as said transparent wall and being cooperable to transmit solar radiation for impingement upon the radiation absorptive wall, said fluid being vaporizable, by heat derived from impingement of solar radiation upon said radiation absorptive wall, and caused to flow from said first chamber and the interstices of said material through said orifices into said relatively small chambers, thereby leaving said scattering material in a substantially dry condition, the radiant heat transmitting characteristics of said scattering material then being effective to prevent impingement of solar radiation upon said absorptive wall, said fluid further being capable of return flow from said relatively small chambers, through said orifices, and into interstices of said material in the absence of such thermal irradiation.

8. In an enclosed structure, a radiant heat transmitting panel in an outer wall thereof, radiant heat absorbing means spaced from, and disposed face to face and substantially coextensive with said heat transmitting panel for absorbing heat transmitted through the latter, said panel and said heat absorbing means cooperating to define a chamber, vaporizable radiant heat transmissive fluid disposed within said chamber and adapted selectively for vaporization by heat conducted from said heat absorptive means, conduit means accommodating flow of fluid to and from said chamber, and light scattering material dispersed throughout said fluid, having the same index of refraction as the latter and, in the presence of said fluid, being effective to transmit radiant heat for impingement on said heat absorbing means, said light scattering materal being effective to modify the heat absorbed by the heat absorbing means as the fluid is vaporized for flow into said conduit means, thereby leaving the scattering material in a relatively dry state in which it prevents transmission of radiant heat impinging thereon, said fluid in the absence of such radiant heat impingement, being capable of return flow from said conduit means to said chamber.

9. Means for controlling the transmission of thermal radiation into an enclosed space, comprising: means defining a first chamber including a wall transparent to such radiation, and black surface wall means confronting said wall; thermal radiation scattering means disposed within said first chamber and comprising a layer of porous scattering material having substantially the same index of refraction as said wall; a vaporizable fluid disposed in said first chamber, filling the interstices of said porous scattering material, and having substantially the same index of refraction as the latter, said material in the presence of said liquid being effective to transmit thermal radiation for impingement on said black surface wall means, said fluid being vaporizable by heat derived from thermal irradiation of said black surface wall means, said scattering material further being operable in the absence of substantial amounts of said vaporizable fluid to scatter radiation impinging thereon; a plurality of fluid flow restrictive orifices extending through said black surface wall and into fluid flow communication with said interstices and with said first chamber; and chamber means communicating with said orifices, said fluid as it is vaporized in said first chamber being caused to flow from the interstices of said scattering material through said orifices into said chamber means, whereby to modify the radiation transmissivity of the scattering material, said fluid being capable of return flow from said chamber means, through said orifices, and into said interstices in the absence of thermal radiation on said black surface wall.

References Cited by the Examiner
UNITED STATES PATENTS

| | | | |
|---|---|---|---|
| 2,448,315 | 8/1948 | Kunzog | 165—154 X |
| 2,501,418 | 3/1950 | Snowden. | |
| 3,018,087 | 1/1962 | Steele | 165—133 X |

MEYER PERLIN, *Primary Examiner.*

CHARLES SUKALO, *Examiner.*

A. W. DAVIS, *Assistant Examiner.*